United States Patent [19]

Magariyama et al.

[11] Patent Number: 4,482,230
[45] Date of Patent: Nov. 13, 1984

[54] VIEW FINDER UNIT MOUNTED ON A SINGLE LENS REFLEX CAMERA

[75] Inventors: Kenichi Magariyama, Yokohama; Makoto Kimura, Tokyo; Hiroshi Terunuma, Ichikawa, all of Japan

[73] Assignee: Nippon Kogaku K.K., Tokyo, Japan

[21] Appl. No.: 460,465

[22] Filed: Jan. 24, 1983

[30] Foreign Application Priority Data

Feb. 1, 1982 [JP] Japan ............................. 57-13334

[51] Int. Cl.$^3$ ............................................. G03B 13/02
[52] U.S. Cl. ..................................... 354/219; 354/407
[58] Field of Search ................. 354/155, 219, 219 IF, 354/224, 225, 406–409, 484

[56] References Cited

U.S. PATENT DOCUMENTS

| | | | |
|---|---|---|---|
| 4,101,912 | 7/1978 | Watanabe | 354/219 X |
| 4,104,650 | 8/1978 | Hosoe et al. | 354/409 X |
| 4,357,086 | 11/1982 | Shimomura | 354/407 |
| 4,360,256 | 11/1982 | Grassl | 354/407 |

*Primary Examiner*—William B. Perkey
*Attorney, Agent, or Firm*—Shapiro and Shapiro

[57] ABSTRACT

A view finder unit removably mounted on a single lens reflex camera body to enable the in-focus state of a picture-taking lens to be observed, the camera body having an opening portion provided to direct an imaging light beam projected by the picture-taking lens to the outside of the camera body, includes a housing removably mounted on the camera body and having an opening portion for directing the imaging light beam into the housing, said opening portion being coincident with the opening portion of the camera body, an optical system disposed in the housing to enable a first image formed by the imaging light beam to be observed through the opening portion of the housing, imaging means disposed in the housing for forming a second image substantially equivalent to the first image, in-focus detecting means including photoelectric detecting means disposed in the housing adjacent to the focal plane of the imaging means and producing an electrical signal representing the state of the second image in the focal plane, display means disposed in the housing and driven by the electrical signal of the in-focus detecting means to observably display the in-focus state of the picture-taking lens, and a battery chamber disposed in the housing for containing therein batteries which supply electrical energy to the in-focus detecting means and the display means.

2 Claims, 3 Drawing Figures

VIEW FINDER UNIT MOUNTED ON A SINGLE LENS REFLEX CAMERA

BACKGROUND OF THE INVENTION

1. Field of the Invention

This invention relates to a single lens reflex camera system which permits interchange of a finder unit, and more particularly to a camera system on which may be mounted an optical finder device provided with means capable of detecting the in-focus state of a picture-taking lens with respect to an object to be photographed.

2. Description of the Prior Art

In recent systematized single lens reflex cameras, the picture-taking lens structure as well as the structures from the finder structure to the back lid are designed as interchangeable units and, by interchanging respective units with other units having different functions, it is possible to create a camera system adaptable for a variety of purposes.

As a task which must necessarily be considered in designing such a systematized single lens reflex camera, there is a problem of the arrangement of interacting elements between a plurality of units forming the camera system. For example, the power source for supplying energy to the electrical devices of the camera system may be disposed in any unit by providing electrical connection between various units.

Particularly, in a camera system of such construction that the in-focus state of the picture-taking lens with respect to an object to be photographed is photoelectrically detected from part of an imaging light beam passed through the picture-taking lens and the lens system is driven to the in-focus position by an electric motor disposed in the picture-taking lens structure, a sufficient consideration must be given to the question of where it is most useful to dispose the power source for supplying power to the in-focus detecting device involving an electric circuit, the display device for displaying the in-focus state and the electric motor.

SUMMARY OF THE INVENTION

It is an object of the present invention to provide an interchangeable finder unit which is useful in efficiently constructing a single lens reflex camera system.

The finder unit according to the present invention is provided with focus detecting means which effects focus detection from finder observation light, display means which effects display within the finder by the output of the focus detecting means, and a power source for operating said two means. Even in case a picture-taking lens incapable of automatic focusing is mounted on a camera body having the finder unit of the present invention mounted thereon, the finder unit can effect focus detection and the display thereof. The finder unit according to an embodiment of the present invention is provided with an output terminal for receiving the output of focus detecting means and transmitting a signal for directing the picture-taking lens to the in-focus state, and can effect automatic focusing by the signal from this output terminal when use is made of a picture-taking lens provided with an electric motor for focusing operation.

Also, in an embodiment of the present invention, power is supplied from a power source provided in the finder unit to the motor in the picture-taking lens, and this leads to the elimination of the necessity of providing a power source in the picture-taking lens structure and the possibility of making the lens structure compact.

The invention will become more fully apparent from the following detailed description thereof taken in conjunction with the accompanying drawings.

DESCRIPTION OF THE PREFERRED EMBODIMENTS

Figure 1:
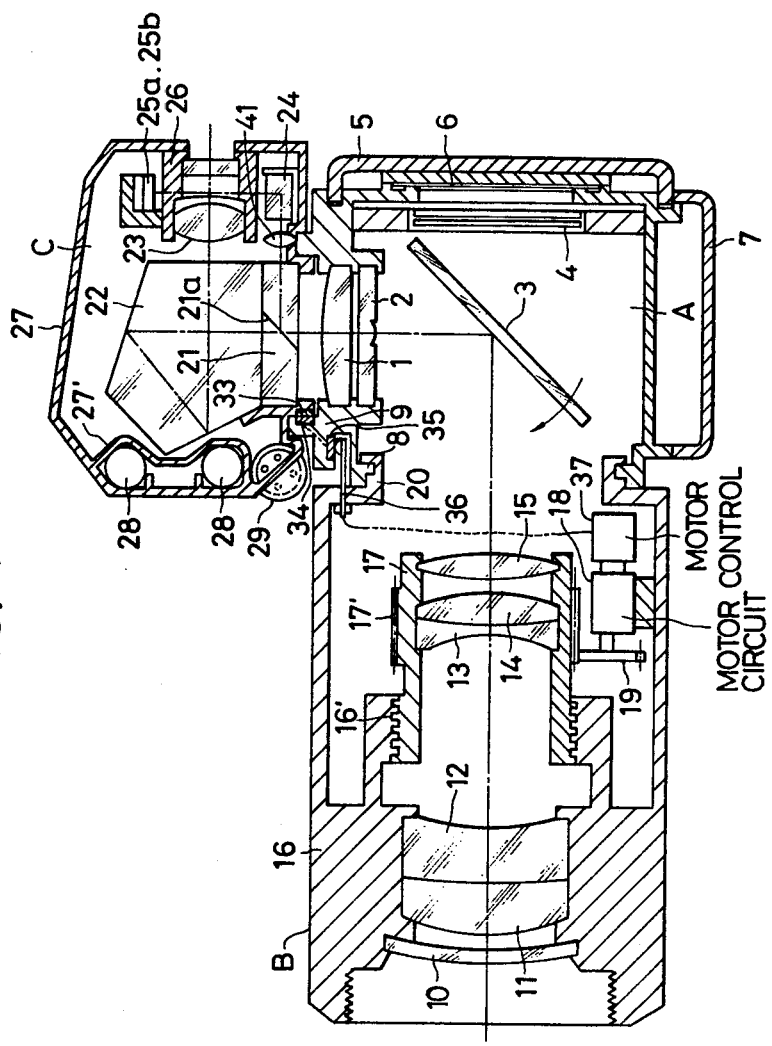
FIGS. 1 to 3 show an embodiment of the present invention, FIG. 1 being a cross-sectional view showing a picture-taking lens structure and a finder unit as mounted on a camera body, FIG. 2 being a perspective view showing the appearance of the finder unit, and FIG. 3 being a block diagram of electric circuits provided in the camera body, the picture-taking lens structure and the finder unit.

FIG. 1 is an embodiment of the present invention and shows a picture-taking lens structure B and a finder unit C as mounted on a camera body A.

The camera body A includes a condenser lens 1, a screen 2, a quick return mirror 3, a shutter 4, a back lid 5, a film 6, a bottom lid 7, a body side bayonet mount 8 and a finder unit mounting portion 9.

Within the lens structure B, stationary lenses 10, 11, 12 and movable lenses 13, 14, 15 are provided in a stationary barrel 16 and a movable barrel 17, respectively. The movable barrel 17 is threadably held by the helicoid screw 16' of the stationary barrel 16. The picture-taking lens system is constituted by these lenses 10–15. The outer periphery of the movable barrel 17 is provided with a gear 17' of great tooth width. The gear 17' is in mesh engagement with a pinion gear 19 secured to the rotaty shaft of a reversible motor 18, so that the rotative drive force of the motor 18 rotates the movable barrel 17 through the intermediary of the gears 19 and 17' and further moves the movable barrel 17 in the direction of the optical axis while rotating the movable barrel 17 in accordance with the lead of the helicoid 16'. A bayonet type lens mount portion 20 for removably holding the lens structure B with respect to the camera body A is secured to the right end of the stationary barrel 16.

Figure 2:
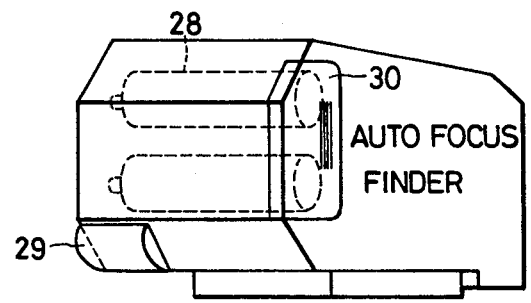

Within the finder unit C, there are provided a beam splitter 21 for receiving light entering through the picture-taking lenses 10–15, the quick return mirror 3, the screen 2 and the condenser lens 1, namely, finder observation light, a penta roof prism 22 and an eyepiece 23. The beam splitter 21 is provided with a semi-transparent portion 21a, by which part of the finder observation light is reflected toward a rearward re-imaging lens 41. The finder unit C is further provided with a beam splitter 24 for dividing the imaging light beam from the re-imaging lens into two light beams and reflecting the divided light beams in opposite directions perpendicular to the plane of the drawing sheet of FIG. 1, two reflecting mirrors (not shown) for upwardly reflecting the light beams divided by the beam splitter 24, and a pair of light-receiving elements 25a, 25b for focus detection for receiving the light beams reflected by the reflecting mirrors. The light-receiving elements 25a, 25b are disposed in the upper portion of an eyepiece holder 26 and lie at positions made substantially equivalent to the film surface by the re-imaging lens. Power supply batteries 28 are positioned within the finder unit C on the opposite side of a finder eyepiece with respect to the penta roof prism 22, and are contained in a battery containing chamber formed by a battery holder 27' secured inside a housing 27. The appearance of the finder unit C is as shown in FIG. 2. Two or more batteries 28 are arranged side by side and contained in the battery containing chamber, as indicated by broken lines. A lid 30 is removably provided in the side surface of the finder unit C so as to permit the batteries 28 to be put into and out of the battery containing chamber. By so providing the battery containing chamber, the batteries are positioned at the locations in the finder unit which are most adjacent to the object side and therefore, the shape of the housing 27 is projected toward the object side. The projection of the finder portion in this direction can avoid impairing the operability of devices disposed in the upper portion of the camera body such as a shutter dial and a film rewind knob, and further prevents any problem from arising in the appearance and shape of the finder unit, particularly the balance of its shape and weight. Designated by 29 is a connector to which is coupled the electrical connection cable of another device, not shown, to operatively control the various devices to be described in the finder unit or the various mechanisms of the single lens reflex camera.

Figure 3:
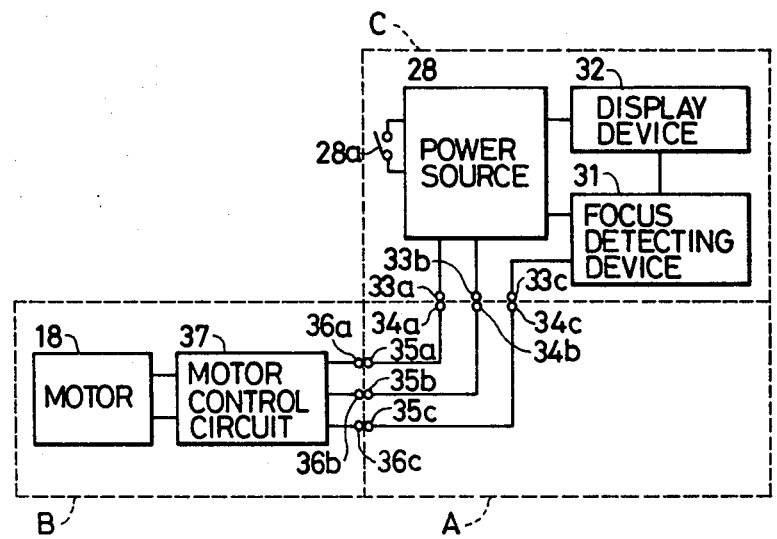

Electrical devices are provided in the camera body A, the picture-taking lens structure B and the finder unit C, as shown in FIG. 3.

A focus detecting device 31 operated by being supplied with power from the power source 28 provided in the finder unit C includes the aforementioned pair of light-receiving elements 25a, 25b and detects from the outputs of the two light-receiving elements whether the picture-taking lenses 10-15 are in in-focus state, or in front focus state or in rear focus state. Such focus detecting operations are successively effected at predetermined short time intervals. Accordingly, focus detections in accordance with the states of the lenses 10-15 are effected in succession. A display device 32 also is operated by being supplied with power from the power source 28. In response to the detection output of the focus detecting device 31, the display device 32 displays within the finder whether the picture-taking lenses 10-15 are in in-focus state, or in front focus state or in rear focus state. A connector 33 having three output terminals 33a, 33b and 33c is provided on the surface of the finder unit which is attached to the camera body A. The terminal 33a is connected to the positive pole of the power source 28, the terminal 33b is connected to the negative pole of the power source 28, and the terminal 33c is connected to the output terminal of the focus detecting device 31. A connector 34 having terminals 34a, 34b and 34c is provided at a location on the camera body A which corresponds to the connector 33. The terminals 33a, 33b and 33c may be connected to the terminals 34a, 34b and 34c, respectively, when the finder unit C is mounted on the camera body A. A connector 35 having three terminals 35a, 35b and 35c connected to the terminals 34a, 34b and 34c, respectively, is further provided on the mount portion of the camera body A. A connector 36 having three terminals 36a, 36b and 36c is provided on the mount portion of the lens structure B. The terminals 36a, 36b and 36c may be connected to the terminals 35a, 35b and 35c, respectively, when the lens structure B is mounted on the camera body A. A motor control circuit 37 transmits the power supplied from the terminals 36a and 36b to the motor 18, and also receives a focus detection signal put out between the terminals 36b and 36c and controls the rotation of the motor 18 so as to rotate the motor in the forward direction or in the reverse direction or stop the motor.

Accordingly, when the shutter button (not shown) of the camera body is slightly depressed with both the finder unit C capable of focus detection and the lens structure B capable of automatic focusing being mounted on the camera body A as shown in FIG. 1, the depression signal of the shutter button is transmitted to the main switch means 28a in the finder unit through unshown connection terminals provided on the camera body A and the finder unit C, whereby the switch means 28a becomes closed to permit power to be supplied from the power source 28 to the focus detecting device 31, the display device 32, the motor control circuit 37 and the motor 18. In accordance with the then state of the picture-taking lens, the focus detecting device 31 produces a focus detection signal such as in-focus, front focus or rear focus, and in response to the focus detection signal, the display device 32 displays the state of the picture-taking lens within the finder. At the same time, the motor 18 receives the supply of power from the power source 28 through the motor control circuit 37, which controls the rotation of the motor 18 on the basis of the focus detection signal put out by the focus detecting device 31. The rotation of the motor 18 is transmitted to the movable barrel 17 through the gears 19 and 17' of FIG. 1, whereby the movable lenses 13-15 are moved in the direction of the optical axis. The movable lenses 13-15 are driven until the focus detecting device 31 puts out an in-focus signal and, when the in-focus signal is put out, that is, when the picture-taking lenses 10-15 assume the in-focus state, the motor 18 is stopped by the control circuit 37 and the movable lenses 13-15 also are stopped. When the in-focus state is thus obtained, the display device 32 also displays that fact. The automatic focusing operation is accomplished in this manner.

If the shutter button is further depressed after the display by the display device 32 has been confirmed, a diaphragm device, not shown, is stopped down from its open state to a predetermined value and the mirror 3 moves up and the shutter 4 moves. When the exposure is completed, the mirror 3 moves down and the diaphragm device returns to its open state.

Thereafter, if the shutter button is released, the main switch means 28a becomes open to cut off the supply of power from the power source 28 to the display device 32, the focus detecting device 31, the motor control circuit 37 and the motor 18.

When the picture-taking lens structure B shown in FIG. 1 is replaced with another picture-taking lens structure having no automatic focusing function, namely, an ordinary lens structure which does not have the motor, the motor control circuit, the terminal 36, etc. and directs the picture-taking lens into its in-focus state by a manually operated distance ring, the focus detecting device 31 receives the outputs of the light-receiving elements by the supply of energy from the power source 28 which responds to the shutter button of the camera body, and produces a focus detection signal in accordance with the state of the picture-taking lens, and the display device 32 receives the focus detection signal and displays the state of the picture-taking lens within the finder. Accordingly, the photographer can direct the picture-taking lens into its in-focus state while confirming the display within the finder. If a manually operating member is provided on the finder unit C so that the main switch means 28a can be manually operated, focus detection and display within the finder can be accomplished in accordance with the state of the picture-taking lens even if the finder unit C is mounted on a camera body of the type which is not operatively associated with the shutter button.

Of course, modification may be made such that power can normally be supplied from the power source 28 to each device without the main switch means 28a being provided.

In the above-described embodiment, it will be noted that by connecting the finder unit and the lens structure by connecting the terminals 33a, 33b and 33c directly to the terminals 36a, 36b and 36c, the terminals 34a, 34b, 34c, 35a, 35b and 35c of the camera body A can be omitted.

We claim:

1. A view finder unit removably mounted on a single lens reflex camera body having an opening portion provided to direct an imaging light beam projected by a picture-taking lens to the outside of said camera body, said view finder unit comprising:
   (a) a housing removably mounted on said camera body and having an opening portion for directing said imaging light beam into said housing, said opening portion being coincident with the opening portion of said camera body;
   (b) an optical system disposed in said housing to enable an image formed by said imaging light beam to be observed, said optical system including a penta roof prism for bending substantially at right angles the light path of said imaging light beam passed through the opening portion of said housing, and a finder eyepiece for directing said imaging light beam emergent from said prism to the outside of said housing to thereby enable said image to be observed, said penta roof prism having a first reflecting surface formed into a roof shape and a second reflecting surface reflecting said imaging light beam from said first reflecting surface to said eyepiece; and
   (c) means disposed on the opposite side of said finder eyepiece with respect to said penta roof prism for supporting at least one bar-like battery in a space provided between said housing and said second reflecting surface, said bar-like battery being supported along said second reflecting surface with the longitudinal direction thereof substantially perpendicular to a plane which is parallel with both of said imaging light beams passed through said opening portion and emergent from said prism.

2. A view finder unit removably mounted on a single lens reflex camera body having an opening portion provided to direct an imaging light beam projected by a picture-taking lens to the outside of said camera body, said view finder unit comprising:
   (a) a housing removably mounted on said camera body and having an opening portion for directing said imaging light beam into said housing, said opening portion being coincident with the opening portion of said camera body;
   (b) an optical system disposed in said housing to enable an image formed by said imaging light beam to be observed, said optical system including a penta roof prism for bending substantially at right angles the light path of said imaging light beam passed through the opening portion of said housing, and a finder eyepiece for directing said imaging light beam emergent from said prism to the outside of said housing to thereby enable said image to be observed, said penta roof prism having a first reflecting surface formed into a roof shape, a second reflecting surface reflecting said imaging light beam from said first reflecting surface to said eyepiece, and an inclined surface formed between said first and second reflecting surfaces; and
   (c) means disposed on the opposite side of said finder eyepiece with respect to said penta roof prism for supporting at least one bar-like battery in a space provided between said housing and said inclined surface, said bar-like battery being supported along said inclined surface with the longitudinal direction thereof substantially perpendicular to a plane which is parallel with both of said imaging light beams passed through said opening portion and emergent from said prism.

* * * * *